(12) United States Patent
Hayes et al.

(10) Patent No.: US 9,867,001 B2
(45) Date of Patent: Jan. 9, 2018

(54) IDENTIFIER FOR DEVICE LOCATION WITHIN WIRELESS COMMUNICATION SYSTEMS

(71) Applicant: BROADCOM CORPORATION, Irvine, CA (US)

(72) Inventors: Raymond Reynolds Hayes, Los Gatos, CA (US); Qi Wang, San Francisco, CA (US)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 121 days.

(21) Appl. No.: 14/714,543

(22) Filed: May 18, 2015

(65) Prior Publication Data

US 2015/0341750 A1    Nov. 26, 2015

Related U.S. Application Data

(60) Provisional application No. 62/002,375, filed on May 23, 2014, provisional application No. 62/156,309, filed on May 3, 2015.

(51) Int. Cl.
| | |
|---|---|
| *H04W 4/02* | (2009.01) |
| *H04W 64/00* | (2009.01) |
| *H04W 76/02* | (2009.01) |
| *G01S 5/02* | (2010.01) |
| *H04W 88/08* | (2009.01) |

(52) U.S. Cl.
CPC ......... *H04W 4/023* (2013.01); *G01S 5/0284* (2013.01); *H04W 64/003* (2013.01);
(Continued)

(58) Field of Classification Search
CPC ..... H04W 88/06; H04W 88/04; H04W 88/08; H04W 8/005; H04W 4/023; H04W 64/00;
(Continued)

(56) References Cited

U.S. PATENT DOCUMENTS

| | | | |
|---|---|---|---|
| 6,484,034 B1 | 11/2002 | Tsunehara et al. | |
| 8,472,998 B2 * | 6/2013 | Black ................... | H04W 48/10 455/552.1 |

(Continued)

OTHER PUBLICATIONS

European Patent Office; Office Action; EP Application No. 150015675; dated May 25, 2016; 7 pgs.
(Continued)

*Primary Examiner* — Luat Phung
*Assistant Examiner* — Thomas R Cairns
(74) *Attorney, Agent, or Firm* — Garlick & Markison; Shayne X. Short

(57) ABSTRACT

A wireless communication device (WDEV) includes a communication interface and a processor, among other possible circuitries, components, elements, etc. to support communications with other WDEV (s) and to generate and process signals associated with such communications. The WDEV supports first communications with a first other WDEV and supports second communications with a second other WDEV. The WDEV processes the first communications and the second communications to determine whether the first other WDEV and the second other WDEV are substantially co-located at a physical location. When not co-located, the WDEV processes the first communications and the second communications based on at least one of a ranging or a location protocol to determine location information of the WDEV. Alternatively, when co-located, the WDEV stores information that indicates co-location of the first other WDEV and the second other WDEV.

20 Claims, 9 Drawing Sheets

(52) U.S. Cl.
CPC ........ *H04W 76/021* (2013.01); *H04W 76/025* (2013.01); *H04W 88/08* (2013.01)

(58) Field of Classification Search
CPC ............. H04W 64/003; H04W 76/021; H04W 76/025; H04W 8/26; G01S 5/0284; G01S 5/14
See application file for complete search history.

(56) References Cited

U.S. PATENT DOCUMENTS

| | | | |
|---|---|---|---|
| 8,625,555 B2* | 1/2014 | Ibrahim | H04W 4/001 370/338 |
| 8,831,655 B2* | 9/2014 | Burchill | H04W 52/243 370/310 |
| 9,398,604 B2* | 7/2016 | Zhang | H04B 15/00 |
| 2004/0259522 A1 | 12/2004 | Alicherry et al. | |
| 2010/0331009 A1 | 12/2010 | Krishnamurthy et al. | |

OTHER PUBLICATIONS

European Patent Office; European Search Report; EP Application No. 15001567.5; dated Nov. 5, 2015; 3 pgs.

Anonymous; Cell ID—Wikipedia, the free encyclopedia; May 17, 2014; 3 pgs. Retrieved from the internet: URL: https://en.wikipedia.org/w/index.php?title=Cell_ID&oldid=608982573; [retrieved on Oct. 27, 2015].

* cited by examiner

IDENTIFIER FOR DEVICE LOCATION WITHIN WIRELESS COMMUNICATION SYSTEMS

CROSS REFERENCE TO RELATED PATENTS/PATENT APPLICATIONS

Provisional Priority Claims

The present U.S. Utility patent application claims priority pursuant to 35 U.S.C. §119(e) to U.S. Provisional App. Ser. No. 62/002,375, entitled "Identifier for device location within wireless communication systems," filed May 23, 2014; and U.S. Provisional App. Ser. No. 62/156,309, entitled "Identifier for device location within wireless communication systems," filed May 3, 2015, both of which are hereby incorporated herein by reference in their entirety and made part of the present U.S. Utility patent application for all purposes.

BACKGROUND

Technical Field

The present disclosure relates generally to communication systems; and, more particularly, to device identification within single user, multiple user, multiple access, and/or MIMO wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

In some wireless communication systems, some devices may communicate with others for various purposes including those operate based on knowing the location of one or more of the devices. However, in prior art systems, there may be instances in which a first device may communicate with a second device and the third device such that the second device and the third device are not located separately from each other. If and when the first device attempts to perform certain operations based on an assumption that the second device and the third device are located separately from each other, then such operations may be problematic, erroneous, etc. The prior art does not present any adequate means by such a first device can effectively determine when the second device and the third device are not located separately from each other.

DETAILED DESCRIPTION

Figure 1:
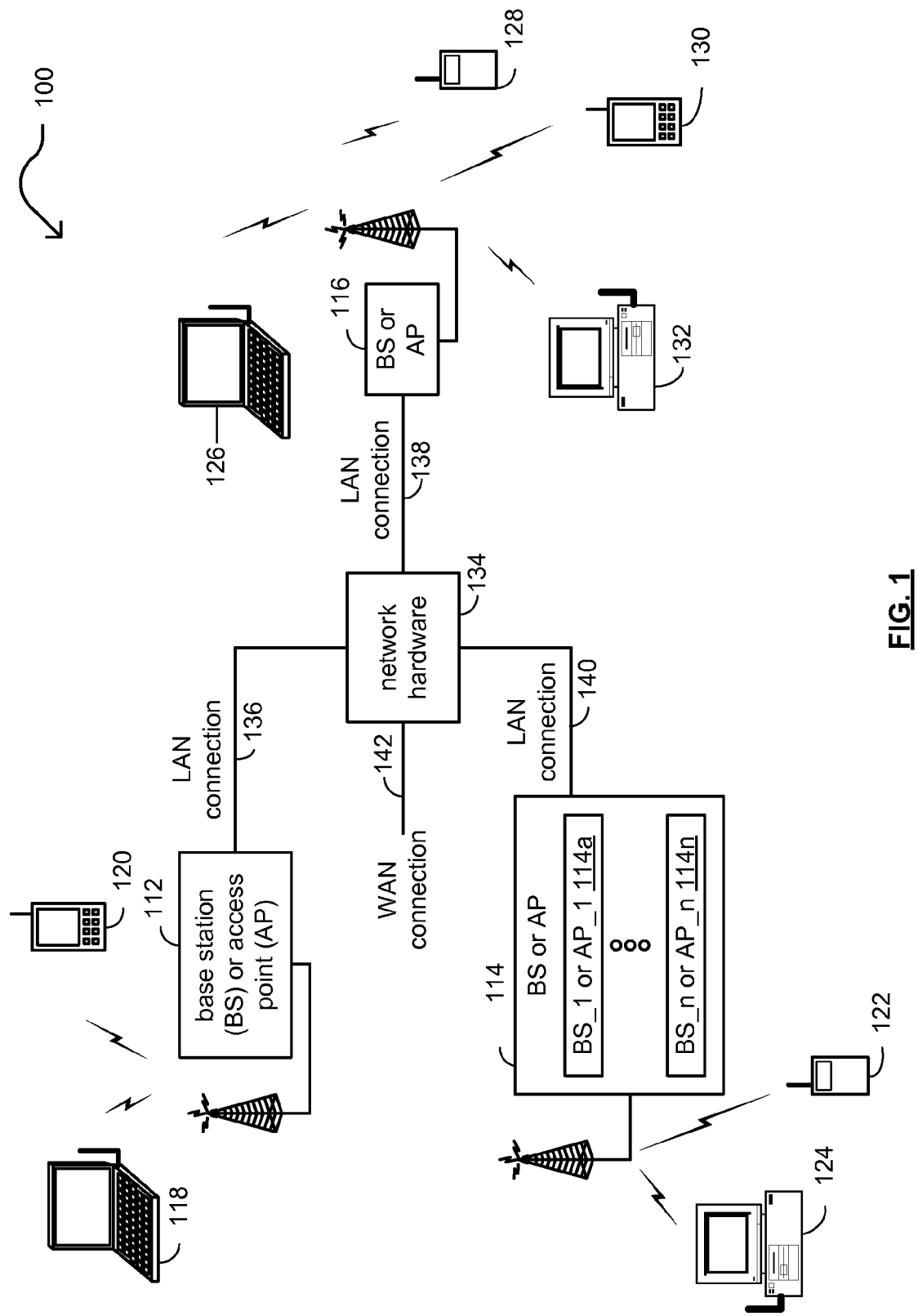
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. The details of an embodiment of such wireless communication devices are described in greater detail with reference to FIG. 3A.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and a communication interface to support communications with any other of the wireless communication devices 118-132 and BSs or APs 112-116. In an example of operation, a processor and a communication interface implemented within one of the devices (e.g., any one of the WDEVs 118-132 and BSs or APs 112-116) are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2 below, "device 210" when referring to "wireless communication device 210" or "WDEV 210," or "devices 210-234" when referring to "wireless communication devices 210-234"; or with respect to FIG. 3 below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processor and the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

The device 122 includes a communication interface and the processor, among other possible circuitries, components, elements, etc. to perform various signal processing operations and to support communications with other devices. In an example operation, the device 122 supports first communications with a first other wireless communication device (e.g., a first BS or AP, BS_1 or AP_1 114a, that is implemented within BS or AP 114) and supports second communications with another (e.g., a second other) wireless communication device (e.g., a second BS or AP, BS_n or AP_n 114n, that is also implemented within BS or AP 114). Generally, the BS or AP 114 may be implemented to include multiple respective other devices therein as shown from BS_1 or AP_1 114a up to BS_n or AP_n 114n, where n is any positive integer greater than or equal to 2.

These first other and second other devices, 114a and 114n, that are implemented within the BS or AP 114 may be implemented in any of a number of different ways including as different respective physical devices, different respective virtual devices, different respective circuitries or components such as different respective radios, etc. Generally speaking, these first other and second other devices, 114a and 114n, that are implemented within the BS or AP 114 may support separate and different communications with other devices including the devices 122 and 124.

In this example operation, when the device 122 supports the first communications with BS_1 or AP_1 114a and the second communications with BS_n or AP_n 114n, the device 122 processes those first and second communications to whether or not the BS_1 or AP_1 114a and the BS_n or AP_n 114n are substantially co-located at a physical location. With respect to being substantially co-located, this may be with respect to the two devices, BS_1 or AP_1 114a and the BS_n or AP_n 114n, being included within a common chassis, a common housing, a common building, a common installation such as within a fence-enclosed installation that includes more than one wireless communication device therein, a common equipment room, etc. Also, with respect to being substantially co-located, this may be with respect to the two devices, BS_1 or AP_1 114a and the BS_n or AP_n 114n, being located within a specified proximity of one another (e.g., 1 meters, 2 meters, 10 meters, etc. or any other particularly specified distance or proximity of one another, generally located within X meters of one another, where X is any desired or specified measurement of distance and which could include distances less than 1 meter).

Regardless of the particular manner or condition used to determine whether or not the BS_1 or AP_1 114a and the BS_n or AP_n 114n are substantially co-located at a physical location, the device 122 makes a determination of whether or not the BS_1 or AP_1 114a and the BS_n or AP_n 114n are substantially co-located at the physical location.

When they are determined not to be co-located at the physical location, the device 122 processes the first communications and the second communications based on a ranging and/or a location protocol to determine location information of the device 122. Alternatively, when they are determined to be co-located at the physical location, the device 122 stores information that indicates co-location of the BS_1 or AP_1 114a and the BS_n or AP_n 114n, and the device 122 processes the first communications associated with the BS_1 or AP_1 114a or the second communications associated with the BS_n or AP_n 114n based on the ranging and/or the location protocol to determine location information of the device 122.

In another example of operation and/or another implementation, the BS or AP 114 includes at least a first radio and the second radio, as shown by BS_1 or AP_1 114a and the BS_n or AP_n 114n. The BS or AP 114 transmit a first communication to device 122 using the first radio, BS_1 or AP_1 114a. The BS or AP 114 also transmits a second communication to device 122 using the first radio, BS_n or AP_n 114n. In this example, a first frame of the first communication includes a first device location identifier (DLID) associated with the first radio, and a second frame of the second communication includes a second DLID associated with the second radio. The first DLID and the second DLID indicate that the first radio and the second radio are substantially co-located at a physical location (e.g., that indicates co-location of the BS_1 or AP_1 114a and the BS_n or AP_n 114n). The BS or AP 114 then supports other communications with the device 122 based on a ranging and/or a location protocol for use by device 122 to determine location information of the device 122 based on other location information of the BS or AP 114.

Also, while a ranging and/or a location protocol are described and used in one particular example, note that any other operations or communications that use, at least in part, information related to or based on knowledge of the co-location or separate location of the BS_1 or AP_1 114a and the BS_n or AP_n 114n may be performed. The use of a ranging and/or a location protocol is one possible example of such operations, but other operations that operate based on knowledge of the co-location or separate location of those other devices may be performed in other examples.

Figure 2:
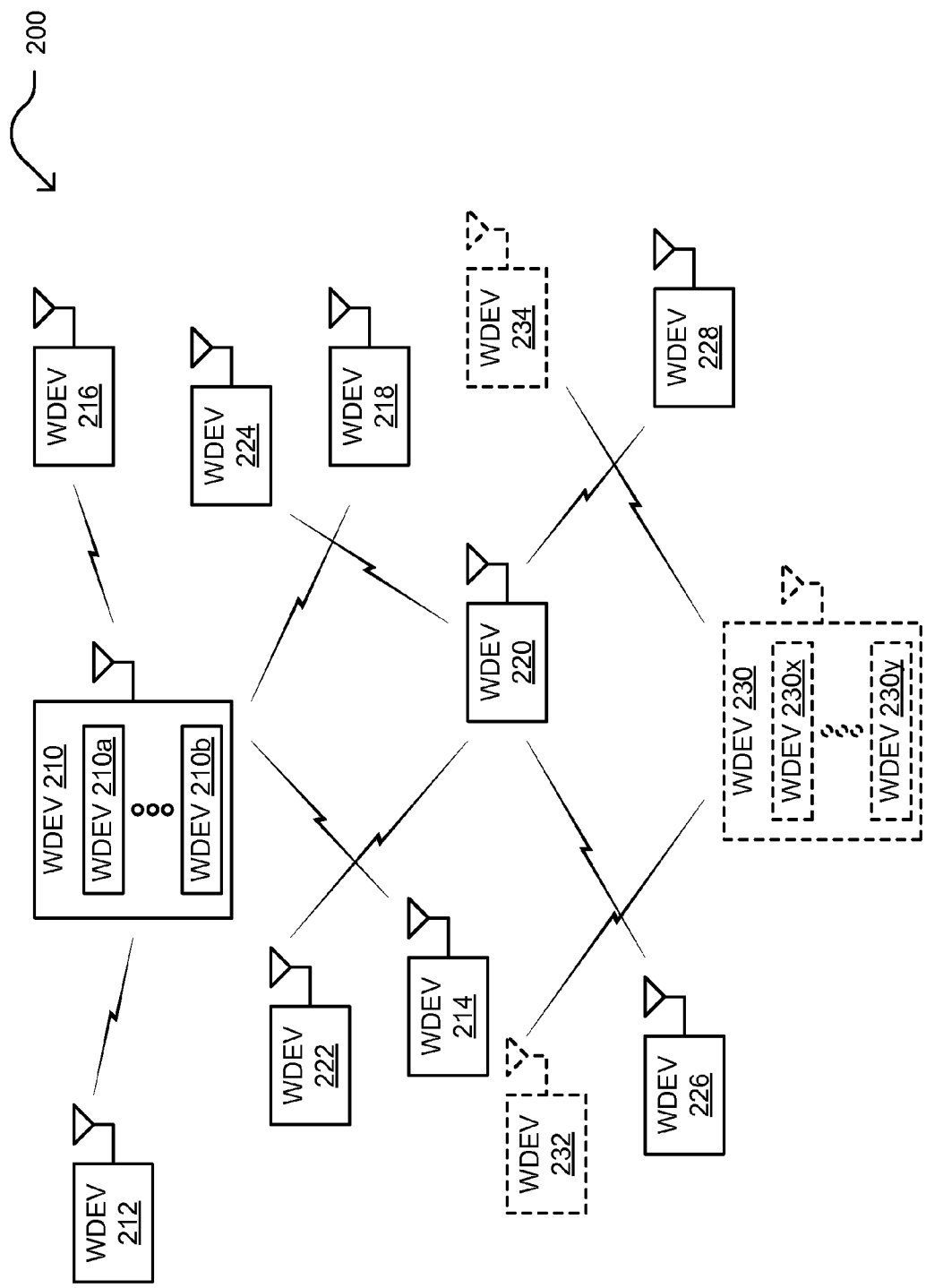
FIG. 2 is a diagram illustrating an embodiment of dense deployment of wireless communication devices.
Figure 3:
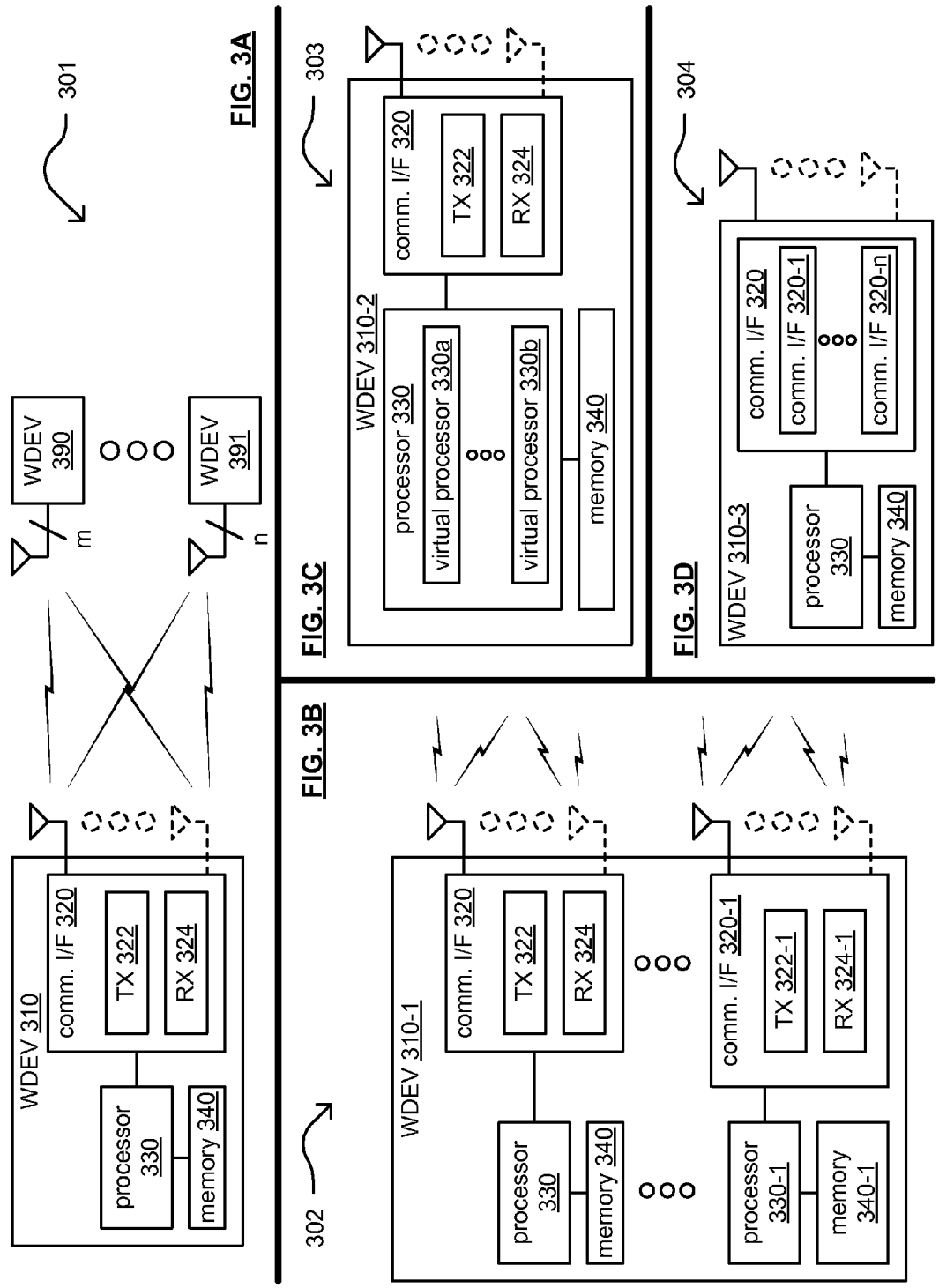
FIG. 3A is a diagram illustrating an example of communication between wireless communication devices.
FIG. 3B is a diagram illustrating an example of a wireless communication device.
FIG. 3C is a diagram illustrating another example of a wireless communication device.
FIG. 3D is a diagram illustrating another example of a wireless communication device.

FIG. 2 is a diagram illustrating an embodiment 200 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

The WDEV 212 includes a communication interface and the processor, among other possible circuitries, components, elements, etc. to perform various signal processing operations and to support communications with other devices. In an example operation, the WDEV 212 supports first communications with a first other wireless communication device (e.g., WDEV 210a, that is implemented within WDEV 210) and supports second communications with another (e.g., a second other) wireless communication device (e.g., WDEV 210b, that is also implemented within WDEV 210). Generally, the WDEV 210 may be implemented to include multiple respective other devices therein as shown from WDEV 210a up to WDEV 210b, where the WDEV 210 includes generally 2 or more wireless communication devices therein.

These first other and second other devices, WDEV 210a up to WDEV 210b, that are implemented within the WDEV 210 may be implemented in any of a number of different ways including as different respective physical devices, different respective virtual devices, different respective circuitries or components such as different respective radios, etc. Generally speaking, these first other and second other devices, WDEV 210a up to WDEV 210b, that are implemented within the WDEV 210 may support separate and different communications with other devices including the device WDEV 212.

Note that other devices, such as WDEV 230, may also include 2 or more wireless communication devices therein (e.g., WDEV 230x up to WDEV 230y)). Note that even other devices, such as WDEV 220, may include only a single wireless communication device therein. Generally, the wireless communications may include any combination of different devices that may respectively include different numbers and/or types of wireless communication devices therein (e.g., different respective physical devices, different respective virtual devices, different respective circuitries or components such as different respective radios, etc.).

In an example operation, when the WDEV 212 support the first communications WDEV 210a and the second communications with the WDEV 210b, the WDEV 212 processes the first communications and the second communications to determine whether the WDEV 210a and the WDEV 210n are substantially co-located at a physical location (e.g., such as based on sharing or implemented within a common chassis, enclosure, housing, building, installation, equipment room, etc. and/or being located within a given proximity to one another such as X meters, where X is any desired are specified measurement of distance used to define co-location, approximate co-location, substantial co-location, etc.).

When the WDEV 212 determines that the WDEV 210a and the WDEV 210b are not substantially co-located at the physical location, the WDEV 212 process the first communications and the second communications based on a ranging and/or a location protocol to determine location information of the WDEV 212. Alternatively, when the WDEV 212 determines that the WDEV 210a and the WDEV 210b are substantially co-located at the physical location, the WDEV 212 stores information that indicates the co-location of the WDEV 210a and the WDEV 210b (e.g., such as both being included within WDEV 210). The WDEV 212 then processes the first communications associated with the WDEV 210a or the second communications associated with the WDEV 210b to determine location information of the WDEV 212 (e.g., by based on a ranging and/or location protocol).

This disclosure presents novel means by which wireless local area network (WLAN/WiFi) technology (e.g., such as associated with any various IEEE 802.11 related standards, recommended practices, and/or communication protocols) may be used to obtain a WLAN device's location or range with respect to another WLAN device such as a peer WLAN device. When a WLAN device (e.g., a wireless station (STA), which may be referred to as STA0) obtains its range estimate to multiple peer WLAN devices (e.g., access points (APs) such as AP0, AP1, . . . APn) that have different physical locations, it (e.g., STA0) can compute its own location if it also knows the locations of the multiple peer devices (e.g., AP0, AP1, . . . APn) (e.g., triangulation and/or other means).

In order to obtain the range estimate to a peer WLAN device, a WLAN device may exchange frames, denoted as Location Traffic throughout this document, with its peer device. The Fine Timing Measurement (FTM) protocol is defined in REFERENCE [1], which is incorporated herein by reference in its entirety and made part of the present U.S. Utility patent application for all purposes, and which allows a device (e.g., an non-AP STA, denoted as an Initiating STA) to estimate its range to a peer device (e.g., an AP, denoted as Responding STA).

[1] IEEE P802.11-REVmc/D2.8, IEEE Standard for Information Technology—Telecommunications and information exchange between systems, local and metropolitan area networks—Specific requirements, Part 11: Wireless LAN Medium Access Control (MAC) and Physical Layer (PHY) Specifications.

When there are multiple virtual devices configured at a single physical peer device and/or location, each of the multiple virtual devices may advertise its support of a range and/or location protocol (e.g., the FTM protocol) individually although all of them have the same physical location.

Examples of the multiple virtual devices at a single physical device may include: (1) Implementation/configuration of multiple BSSIDs (Basic Service Set Identifiers) at a single AP (Access Point) device, (2) Multi-radio, multiple-band-operation supported at a single device, and/or (3) other possible configurations.

As a result, a WLAN device (e.g., STA0) may estimate its range with each of the virtual devices (e.g., AP0_0, AP0_1, . . . , AP0_m) by executing a ranging/location protocol with multiple of the virtual devices that share the same physical location. This leads to the same range estimate with one physical device, creates unnecessary Location Traffic that increases the network congestion, and wastes the spectrum resource.

The FTM (Fine Timing Measurement) protocol is an example ranging protocol defined in the latest 802.11 draft standards [1]. However, [1] lacks a mechanism to prevent a device from performing range estimate (and location) using FTM with multiple virtual devices that share the same physical location.

This disclosure presents novel methods to enable a WLAN device to avoid executing range/location protocol with each of the multiple virtual devices that share the physical location.

As a result, the described methods include various approaches to: (1) Eliminate unnecessary Location Traffic to reduce network congestion, (2) Eliminate unnecessary resource demand at WLAN devices when performing WLAN location, and (3) Improve the efficient use of spectrum while performing ranging/location.

FIG. 3A is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of at least one packet or frame (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

The wireless communication device 310 also includes a processor 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and 391 may each include one or more antennas for transmitting and/or receiving of at least one packet or frame (e.g., WDEV 390 may include m antennae, and WDEV 391 may include n antennae).

In an example of operation, the device 310 support first communications with a first other wireless communication device (device 390) and support second communications with a second other wireless communication device (device 391).) and support second communications with a second other wireless communication device (device 391). The device 310 processes the first communications and the second communications to determine whether the first other wireless communication device and the second other wireless communication device are substantially co-located at a physical location. The device 310 then processes the first communications and the second communications based on at least one of a ranging or a location protocol to determine location information of the wireless communication device when the first other wireless communication device 390 and the second other wireless communication device 391 are determined not to be substantially co-located at the physical location. The device 310 then stores information that indicates co-location of the first other wireless communication device and the second other wireless communication device when the first other wireless communication device 390 and the second other wireless communication device 391 are determined to be substantially co-located at the physical location. The device 310 then processes the first communications associated with the first other wireless communication device 390 or the second communications associated with the second other wireless communication device 391 to determine location information of the device 310 (e.g., by based on a ranging and/or location protocol).

When the first other wireless communication device 390 and the second other wireless communication device 391 are substantially co-located at the physical location, note that the first other wireless communication device 390 and the second other wireless communication device 391 may be first and second virtual wireless communication devices, respectively. They may alternatively be first and second radios of a multi-radio wireless communication device, respectively. They may alternatively be entirely first and second separate wireless communication devices that are sharing or implemented within a common chassis, enclosure, housing, building, installation, equipment room, etc. and/or being located within a given proximity to one another such as X meters, where X is any desired are specified measurement of distance used to define co-location, approximate co-location, substantial co-location, etc.

The device 310 may process the first and second communications to identify device location identifiers (DLIDs) therein. For example, the device 310 may be implemented to process the first communications to identify a first device location identifier (DLID) associated with the first other wireless communication device 390 and to process the second communications to identify a second DLID associated with the second other wireless communication device 391.

The device 310 then determines, when the first DLID is same as the second DLID, that the first other wireless communication device and the second other wireless communication device are substantially co-located at the physical location and store the information that indicates the co-location of the first other wireless communication device 390 and the second other wireless communication device 391. The device 310 then processes first communications associated with the first other wireless communication device 390 or second communications associated with the second other wireless communication device 391 to determine location information of the device 310 (e.g., by based on a ranging and/or location protocol).

Alternatively, the device 310 then determines, when the first DLID is different than the second DLID, that the first other wireless communication device 390 and the second other wireless communication device 391 are not substantially co-located at the physical location.

Generally speaking, such DLID related information may be implemented within communications, frames, signals, etc. that are transmitted between devices in any of a variety of ways including information elements (IEs), sub-information element (sub-IEs), fields, etc.

In one example, the device 310 processes the first communications to identify a first device location identifier (DLID) associated with the first other wireless communication device 390 and processes the second communications to identify a second DLID associated with the second other wireless communication device 391. The device 310 then determines, when the first DLID is same as the second DLID, that the first other wireless communication device 390 and the second other wireless communication device 391 are substantially co-located at the physical location and stores the information that indicates the co-location of the first other wireless communication device 390 and the second other wireless communication device 391. The device 310 then processes first communications associated with the first other wireless communication device 390 or second communications associated with the second other wireless communication device 391 to determine location information of the device 310 (e.g., by based on a ranging and/or location protocol).

Alternatively, when the device 310 then determines that the first DLID is different than the second DLID, the device 310 then determines that the first other wireless communication device 390 and the second other wireless communication device 391 are not substantially co-located at the physical location.

Also, note that the device 310 may support such communications generally with any number of other wireless communication devices (e.g., up to n other wireless communication devices, where n is any positive integer greater than or equal to 2). The operations and processes described in which the device 310 determines whether or not the first other wireless communication device 390 and the second other wireless communication device 391 are substantially co-located at the physical location may be repeated in performed separately with respect any number of other wireless communication devices as well. Note also that the various devices 310, 390, 391 may be any type of wireless communication devices including those described with respect to FIG. 1 and may include one or more of a wireless station (STA) and/or an access point (AP).

FIG. 3B is a diagram illustrating an example 302 of a wireless communication device. In another example, a device 310-1 may be implemented to include two or more separate wireless communication devices therein such as including two or more separate communication interfaces 320 through 320-1 (e.g., where the communication interface 320-1 includes TX 322-1 and RX 423-1), two or more processors 330 through 330-1, two or more memories 340 through 340-1. In such an example, the device 310-1 includes multiple instantiations of the circuitries, components, elements, etc. shown within the device 310 of FIG. 3A.

In this example, the device 310-1 transmits a first communication to another wireless communication device (e.g., device 390) using the first communication interface 320 and transmits a second communication to the another wireless communication device (e.g., device 390) using the first communication interface 320-1. A first frame of the first communication includes a first device location identifier (DLID) associated with the first communication interface 320, and a second frame of the second communication includes a second DLID associated with the second communication interface 320-1. The first DLID and the second DLID indicate that the first communication interface 320 and the second communication interface 320-1 are substantially co-located at a physical location (e.g., such as when the first DLID and the second DLID are same, identical, etc.).

Note that while some examples herein described herein include a first DLID included in a first frame and a second DLID included in a second frame, in general, both the first and second DLIDs can be included in any frame, packet, signal, etc. sent by the different respective devices in any desired example (e.g., including different respective devices included within a common chassis, a common housing, a common building, etc.).

The device 310-1 then supports other communications with the another communication device (e.g., device 390) based on a ranging and/or a location protocol for use by the another communication device (e.g., device 390) to determine location information of the another wireless communication device (e.g., device 390) based on other location information of the wireless communication device 310-1. In such an example, note that the another wireless communication device (e.g., device 390) can perform such a process with multiple (e.g., two or more) other devices to determine location of the another wireless communication device (e.g., device 390). This is also the case with respect to the example 303 of FIG. 3C and the example 304 of FIG. 3D described below.

FIG. 3C is a diagram illustrating another example 303 of a wireless communication device. In another example, a device 310-2 may be implemented to include a single communication interface 320, two or more virtual processors 330a through 330b implemented within processor 330, and memory 340.

In this example, the device 310-2 transmits, via the virtual processor 330a, a first communication to another wireless communication device (e.g., device 390) using the communication interface 320 and transmits a second communication, via the virtual processor 330b, to the another wireless communication device (e.g., device 390) using the communication interface 320. A first frame of the first communication includes a first DLID associated with the virtual processor 330a, and a second frame of the second communication includes a second DLID associated with the virtual processor 330b. The first DLID and the second DLID indicate that the virtual processor 330a and the virtual processor 330b are substantially co-located at a physical location (e.g., such as when the first DLID and the second DLID are same, identical, etc.).

The device 310-2 then supports other communications with the another communication device (e.g., device 390) based on a ranging and/or a location protocol for use by the another communication device (e.g., device 390) to determine location information of the another wireless communication device (e.g., device 390) based on other location information of the wireless communication device 310-2.

FIG. 3D is a diagram illustrating another example 304 of a wireless communication device. In another example, a device 310-3 may be implemented to include a first communication interface 320-1 through an n-th com interface 320-n such as implemented within the communication interface 320, a processor 330, and memory 340. In such an example, the device 310-3 transmits, via the first communication interface 320-1, a first communication to another wireless communication device (e.g., device 390) using the communication interface 320 and transmits a second communication, via another communication interface 320-n, to the another wireless communication device (e.g., device 390) using the communication interface 320. A first frame of the first communication includes a first DLID associated with the first communication interface 320-1, and a second frame of the second communication includes a second DLID associated with the another communication interface 320-n. The first DLID and the second DLID indicate that the first communication interface 320-1 and the another communication interface 320-1 are substantially co-located at a physical location (e.g., such as when the first DLID and the second DLID are same, identical, etc.).

The device 310-3 then supports other communications with the another communication device (e.g., device 390) based on a ranging and/or a location protocol for use by the another communication device (e.g., device 390) to determine location information of the another wireless communication device (e.g., device 390) based on other location information of the wireless communication device 310-3.

Generally speaking, a given device may be implemented in any of a number of different architectures, configurations, etc. in which different respective physical devices, virtual devices, circuitries, radios, components, etc. therein may support communications and indicate that those respective different physical devices, virtual devices, circuitries, radios, components, etc. therein are substantially co-located (e.g., such as based on sharing or implemented within a common chassis, enclosure, housing, building, installation, equipment room, etc. and/or being located within a given proximity to one another such as X meters, where X is any desired are specified measurement of distance used to define co-location, approximate co-location, substantial co-location, etc.)

Figure 4:
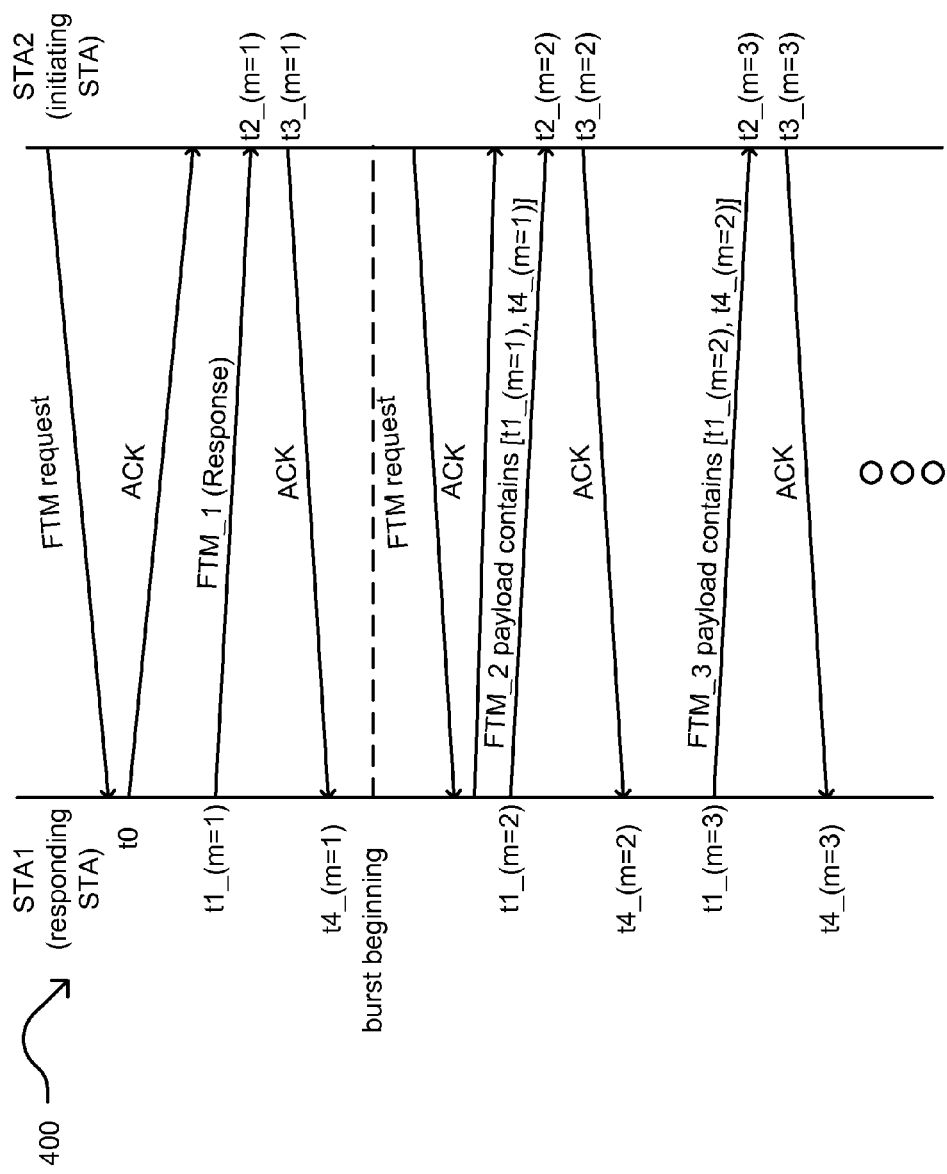
FIG. 4 is a diagram illustrating an example of fine timing measurement (FTM) frame exchange.

FIG. 4 is a diagram illustrating an example 400 of fine timing measurement (FTM) frame exchange. This diagram is an illustration of the FTM protocol described in [1] (cited above). An Initiating STA requests the Responding STA to transmit FTM frames which contain the timestamps t1 and t4, so that the Initiating STA can compute its range to the Responding STA by the method of RTT (Round trip time).

The Fine Timing Measurement (FTM) allows a wireless station (STA) (e.g., a wireless communication device) to accurately measure the Round Trip Time (RTT) between it (e.g., STA2, initiating STA, shown as located on right hand side) and another STA (e.g., STA1, responding STA, shown as located on left hand side). Generally, an initiating wireless communication device (e.g., STA2) transmits a FTM request to a responding wireless communication device (e.g., STA1). The responding wireless communication device (e.g., STA1) then generates and transmits a response to the FTM request frame (e.g., which may be referred to as an 'FTM response' or generally as a 'response' or a 'response to the FTM request frame') to the initiating wireless communication device (e.g., STA2) (e.g., such as shown as a Response in this diagram). Note that the response to the FTM request frame may be generated and transmitted using any of a number of different means. In one example, the response to the FTM request may be piggybacked within an FTM frame (e.g., FTM_1).

In another example, the response to the FTM request frame may be a general response. One example of a response to the FTM request frame includes an acknowledgement (ACK) frame. In another example, the response to the FTM request frame may be included within a block acknowledgement (BACK) frame. In yet another example, the response to the FTM request frame may be an FTM acknowledgement (ACK) frame. In another example, the response to the FTM request frame may be piggybacked onto or included within any other frame (e.g., besides an FTM frame) transmitted from the wireless communication device to the other wireless communication device via the communication interface. Any desired form of response may be used to generate and transmit the response to the FTM request frame to the other wireless communication device.

The initiating wireless communication device (e.g., STA2) and the responding wireless communication device (e.g., STA1) make various subsequent frame exchanges (e.g., FTM frames) of FTM_m, FTM (m+1), FTM (m+2), etc. and acknowledgements (ACKs) to the FTM frames. Considering an example of FTM_1, FTM_2, and FTM_3, the responding wireless communication device (e.g., STA1) transmits the FTM_m frame, which includes $t1(m-1)$ and $t4\_(m-1)$ in its payload, after transmitting a response to the FTM request to the initiating wireless communication device (e.g., STA2) in response to the FTM request received from the initiating wireless communication device (e.g., STA2). The time $t1\_m$ corresponds to the transmission time of the $m^{th}$ FTM frame captured by the responding STA1, the time $t2\_m$ corresponds to the reception time of the $m^{th}$ FTM frame captured by the initiating STA2, the time $t3\_m$ corresponds to the transmission time of the ACK frame in response to the $m^{th}$ FTM frame captured by the initiating STA2, and $t4\_m$ corresponds to the reception time of the ACK frame that is in response to the $m^{th}$ FTM frame captured by the responding STA1.

The responding wireless communication device (e.g., STA1) provides additional FTM frames (e.g., $(m+1)^{th}$ FTM frame, denoted as FTM_(m+1), (m+2)$^{th}$ FTM frame, denoted as FTM_(m+2), etc.) to the initiating wireless communication device (e.g., STA2) that indicate additional respective transmission times of the corresponding FTM frames and the reception times the corresponding ACKs. The initiating wireless communication device (e.g., STA2) transmits additional ACKs in response to these additional received FTM frames and captures additional respective reception times of the corresponding FTM frames and transmission times of the corresponding ACK.

Note that alternative implementations of this FTM frame exchange may be performed that includes transmitting modified beacons, other signals, and/or other types of frames that include FTM related information and/or timestamps related information, and responses to such modified beacons, other signals, or other types of frames may also have various forms (e.g., acknowledgement (ACK), null data packet (NDP), other signals, or other types of frames).

In an example of operation, the device 310 is the initiating STA and the device 390 is the responding STA. When the device 310 has determined that the device 391 is a separate and distinct wireless communication device and not substantially co-located with another device and the device 391 can be used to perform such an FTM frame exchange, then the device 310 (the initiating STA) executes the FTM frame exchange with the device 390 (the responding STA). Note that whichever device is an initiator of such a process can perform such a process with multiple (e.g., two or more) other devices to determine its location (e.g., such as based on a ranging and/or a location protocol).

Figure 5:
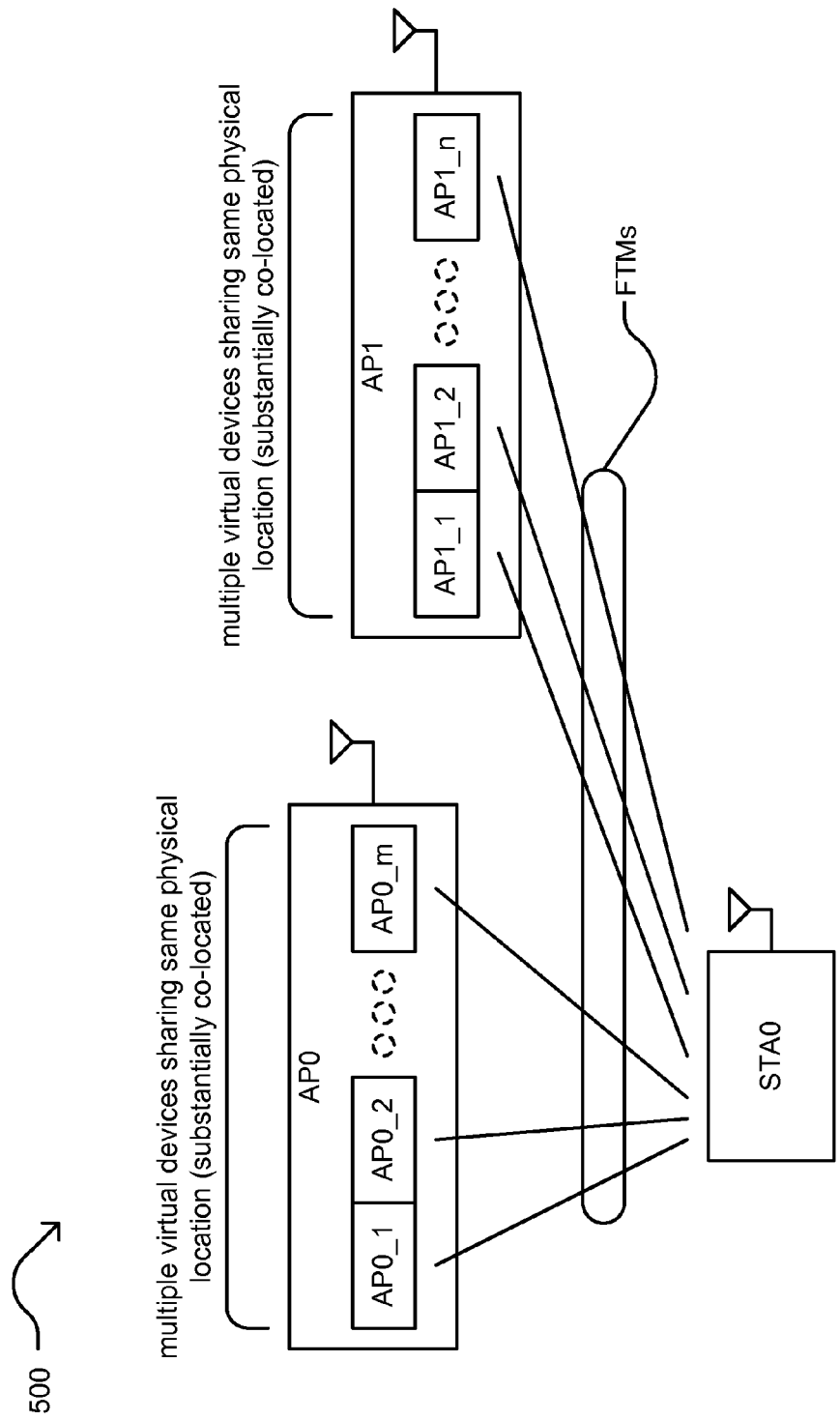
FIG. 5 is a diagram illustrating an example of a wireless station (STA) executing FTM with multiple other wireless communication devices (e.g., STAs and/or Access points (APs)) sharing the same physical location(s).

FIG. 5 is a diagram illustrating an example 500 of a wireless station (STA) executing FTM with multiple other wireless communication devices (e.g., STAs and/or Access points (APs)) sharing the same physical location(s).

If the Responding STA (e.g., AP0) as a physical device has multiple virtual devices (e.g., AP0_1 up to AP0_m, where m is any positive integer greater than or equal to 2), and more than one of these multiple virtual devices advertise the support of the FTM capability, the Initiating STA (e.g., STA0) may initiate the FTM procedure with each of the FTM capable virtual device, despite the fact that the Initiating STA has the same range with these multiple virtual devices.

The method described in this disclosure enables the Initiating STA (e.g., STA0) to identify all the multiple virtual devices (e.g., AP0_1 . . . AP0_m) that share a single physical location, so that it only initiates the FTM procedure with one of the multiple devices. For example, a first wireless communication device (e.g., AP0) is a first physical device that includes a first set of virtual devices (e.g., AP0_2 . . . AP0_m), and a second wireless communication device (e.g., AP1) is a second physical device that includes a second set of virtual devices (e.g., AP1_1 up to AP1_n, where n is any positive integer greater than or equal to 2).

Figure 6:
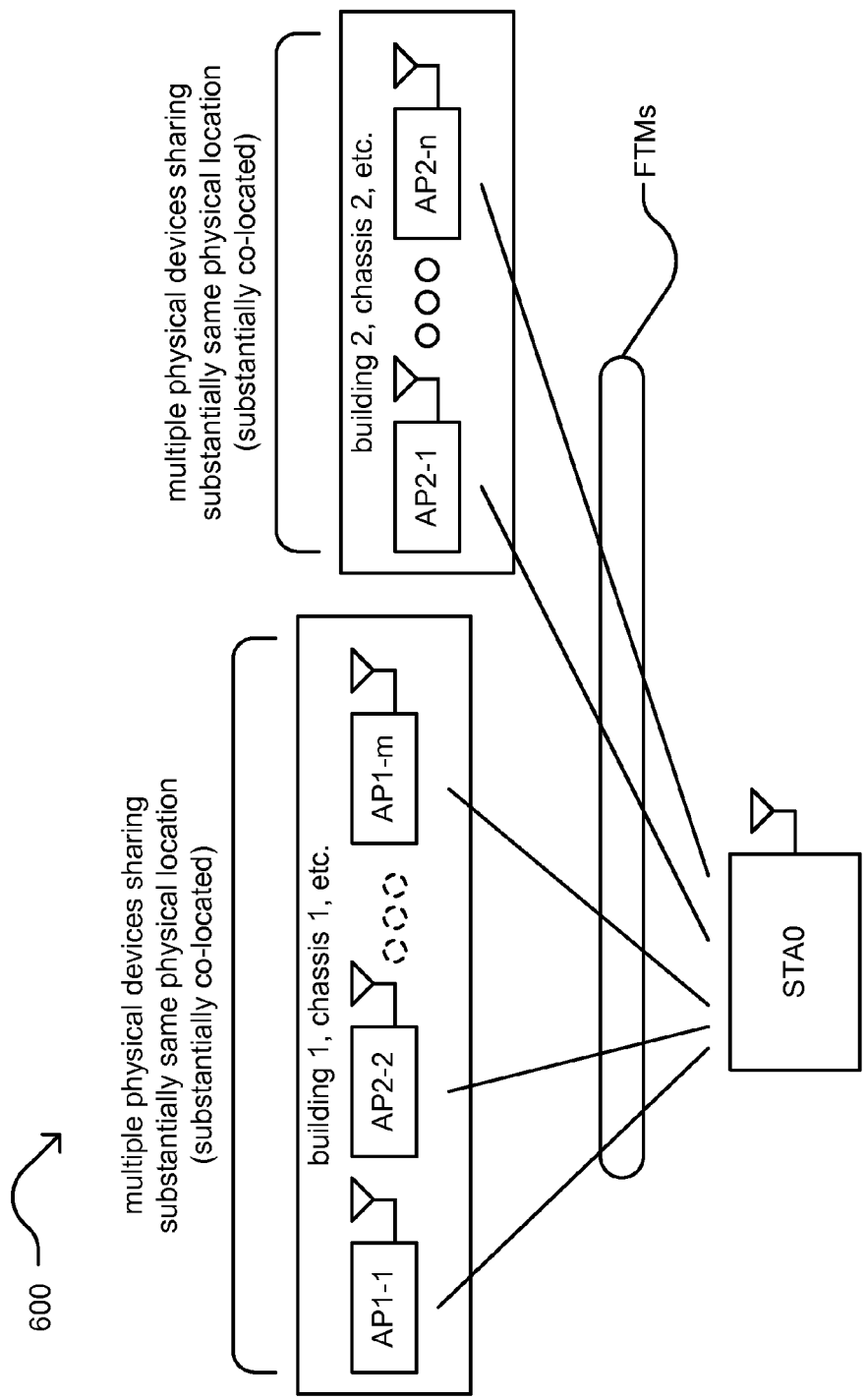
FIG. 6 is a diagram illustrating another example of a wireless station (STA) executing FTM with multiple other wireless communication devices (e.g., STAs and/or Access points (APs)) sharing the same physical location(s).

FIG. 6 is a diagram illustrating another example 600 of a wireless station (STA) executing FTM with multiple other wireless communication devices (e.g., STAs and/or Access points (APs)) sharing the same physical location(s). This diagram shows a first building, chassis, etc. that includes a first set of physical wireless communication devices (e.g., AP1-1 up to AP1-m, where m is any positive integer greater than or equal to 2)), and a second building, chassis, etc. that includes a second set of physical wireless communication devices (e.g., AP2-1 up to AP2-n, where n is any positive integer greater than or equal to 2)).

As described above, different types of information may be included within communications that are transmitted between wireless indication devices to indicate device location and/or co-location with other devices. For example, a device location identifier (DLID) associated with a given device, whether physical or virtual, can be included within communications provided from that given device. Generally speaking, a DLID is an identifier that identifies all virtual devices that share the same physical location (e.g., AP0_1 . . . AP0_m as illustrated in FIG. 5 share the same Device Location ID or DLID).

As such, different DLIDs can be used to differentiate different respective devices with different physical locations.

Some example formats (e.g., encoding methods) for the DLID as described as follows:

1. Option 1: Device Location ID=BSSID of one of the virtual devices supported at a physical device. This Option 1 guarantees the uniqueness of the ID or DLID.

2. Option 2: Device Location ID=a 2- or 3-octet random value generated locally by the device. Relative to Option 1, Option 2 provides a lower overhead due to the reduced size; the collision probability in one geographical area is sufficient low. Other length, including a non-integer number of octets, (e.g., 4-octet or 2.5-octets) can be used for the random value, without a loss of generality. The selection of the length is a tradeoff between the probability of value collision and the transmit overhead size.

In some instances, the DLID is included in frames transmitted for the ranging and/or location purposes. For example, the DLID may be included within communications as follows:

1. Include Device Location ID in the frames that advertise the ranging/location capability of each virtual device (e.g., AP0_0, AP0_1, . . . AP0_m, AP1_1 through AP1_n FIG. 5). One possible example is using beacon frames (e.g., transmitted by AP0_1 through AP0_m or from AP1_1 . . . AP1_n as in FIG. 5 or transmitted by AP0_1 through AP0_m or from AP1_1 through AP1_n as in FIG. 6). Another possible example is using probe responses frame (e.g., transmitted by AP0_1 through AP0_m or from AP1_1 . . . AP1_n as in FIG. 5 or transmitted by AP0_1 through AP0_m or from AP1_1 through AP1_n as in FIG. 6).

2. Include Device Location ID in the frames that transmit the location information (e.g., LCI (Location Configuration Information)) of a particular wireless local area network (WLAN/WiFi) device. Example frames may be those that transmit the Location information (e.g., LCI) may include Neighbor Report frame, LCI Report frame, FTM frame, and/or Access Network Query Protocol (ANQP) Response frame.

Note that such a device location identifier (DLID) or Device Location ID can be included in any of a number of different forms within communications including Information Element (IE), Sub-Information Element, frame field, frame sub-field or other suitable data structure in other appropriate frames.

For example, a first DLID associated with first wireless communication device (e.g., whether physical or virtual) may be included within a first DLID information element (IE) or a first sub-IE that is included within a first frame of first communications transmitted from a wireless communication device, and a second DLID associated with second wireless communication device (e.g., whether physical or virtual) is included within a second DLID IE or a second sub-IE that is included within a second frame of second communications transmitted from the wireless communication device.

Alternatively, a first DLID associated with first wireless communication device (e.g., whether physical or virtual)

may be included within a first DLID field that is included within a first frame of the first communications transmitted from the wireless communication device, and a second DLID associated second first wireless communication device (e.g., whether physical or virtual) is included within a second DLID field that is included within a second frame of second communications transmitted from the wireless communication device.

Figure 7A:
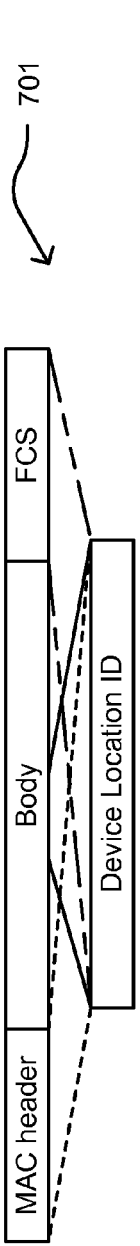
FIG. 7A is a diagram illustrating an example of a media access control (MAC) frame that includes a device location identifier (DLID).

FIG. 7A is a diagram illustrating an example 701 of a media access control (MAC) frame that includes a device location identifier (DLID). Generally speaking, a frame (e.g., MAC frame) employed within such wireless communications can be implemented to include the following basic components: media access control (MAC) header, a variable length frame body, and a frame check sequence (FCS).

In certain embodiments, the MAC header includes fields for each of frame control (FC), duration (DUR/ID), address (e.g., receiver and/or transmitter addresses), sequence control information, optional Quality of Service (QoS) Control information (e.g., for QoS data frames only), and HT Control fields (+HTC frames only) (optional fields). Note that such a frame structure is illustrative and an example of such a frame structure, and alternative embodiments of frame structures may also be employed.

Figure 7B:
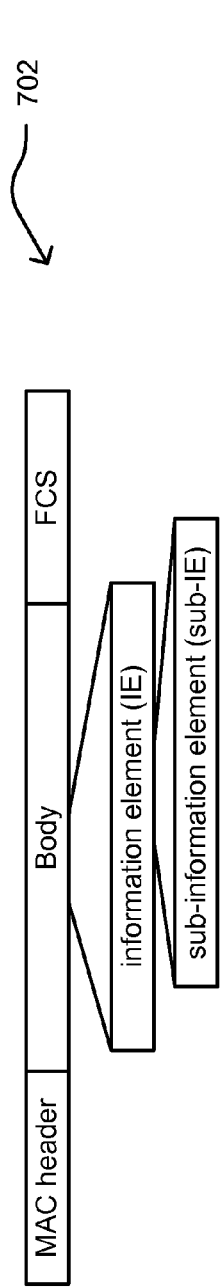
FIG. 7B is a diagram illustrating an example of a media access control (MAC) frame that includes an information element (IE) or a sub-information element (sub-IE).

FIG. 7B is a diagram illustrating an example 702 of a media access control (MAC) frame that includes an information element (IE) or a sub-information element (sub-IE). This diagram has some similarities to FIG. 7A. The body can include one or more information elements (IEs). In some instances, an IE can include one or more sub-information elements (sub-IEs).

Figure 7C:
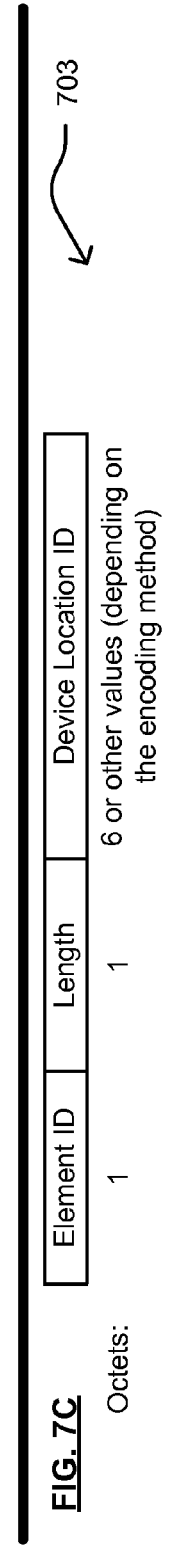
FIG. 7C is a diagram illustrating an example of use of a device location identifier (DLID) included within a device location ID IE.

FIG. 7C is a diagram illustrating an example 703 of use of a device location identifier (DLID) included within a device location ID IE. A DLID is included as 6 (or some other number) octets (e.g., depending on the encoding method used) and is preceded by an element identifier (ID) field of 1 octet and a length field of 1 octet.

Figure 7D:
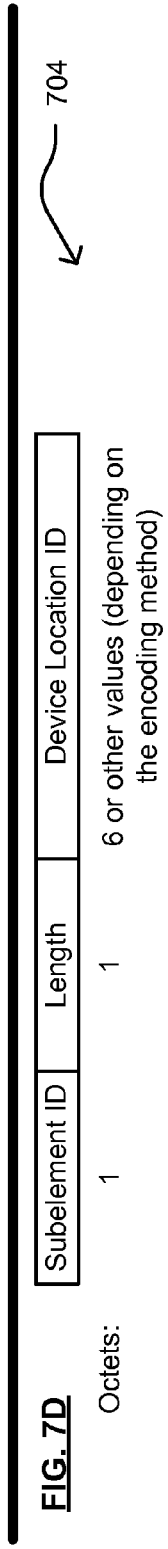
FIG. 7D is a diagram illustrating an example of use of a DLID included within a device location ID sub-IE.

FIG. 7D is a diagram illustrating an example 704 of use of a DLID included within a device location ID sub-IE. A DLID is included as 6 (or some other number) octets (e.g., depending on the encoding method used) and is preceded by a sub-element identifier (ID) field of 1 octet and a length field of 1 octet.

Figure 7E:
FIG. 7E is a diagram illustrating an example of use of a DLID included generally as a field within a frame.

FIG. 7E is a diagram illustrating an example 705 of use of a DLID included generally as a field within a frame. A DLID field is included as 6 (or some other number) octets or 48 (or some other number) bits (e.g., depending on the encoding method used).

Figure 8:
FIG. 8 is a diagram illustrating another example of use of a DLID for wireless local area network (WLAN/WiFi) location.

FIG. 8 is a diagram illustrating another example 800 of use of a device location identifier (ID) for wireless local area network (WLAN/WiFi) location. When a device examines the DLID, the initiating STA (e.g. STA0) avoids attempting to execute the FTM (or other ranging and/or location protocol) with the multiple virtual or physical devices (e.g., AP0_0, AP0_1, . . . AP0_m) that share the same physical address. Examples are shown in the table in this diagram. Note that it may be assumed that the physical device AP0 contains virtual or physical device AP0_0 and AP0_1, and the physical device AP1 contains virtual device AP1_0 and AP1_1 in such an examples 705 as shown in FIG. 7E. Note that such sub-systems, sub-devices, etc. within a physical device that share the same location (e.g., are substantially co-located) can be virtual devices or physical devices.

Note also that while various examples herein use the terminology of device location identifier (DLID), any label of the information that conveys such location identification information may be used in alternative examples. For example, the format (or encoding method) of DLID or Device Location ID can be different from the description provided above. DLID or Device Location ID can be used for a ranging/location protocol that is different from the FTM protocol. DLID or Device Location ID can be included in an Information Element (IE), Sub-Information Element (sub-IE), frame field, frame sub-field or other suitable data structure of suitable frames, without a loss of generality. Note also that various aspects, embodiments, and/or their equivalents, of the invention are applicable to all IEEE 802.11 or WLAN operation bands (e.g., 2.4 GHz, 5 GHz, 60 GHz, 900 MHz, or TV white space, etc.) and/or any other frequencies, bands, channels, etc. that may be used within any wireless communication systems and within any other wireless communication standards, protocols, and/or recommended practices. Note also that various aspects, embodiments, and/or their equivalents, of the invention are applicable to any pair of distinct WLAN devices, regardless of topological roles or relationships. DLID or Device Location ID can be used to identify the multiple virtual devices that share the same physical location in use cases other than ranging/location.

Figure 9:
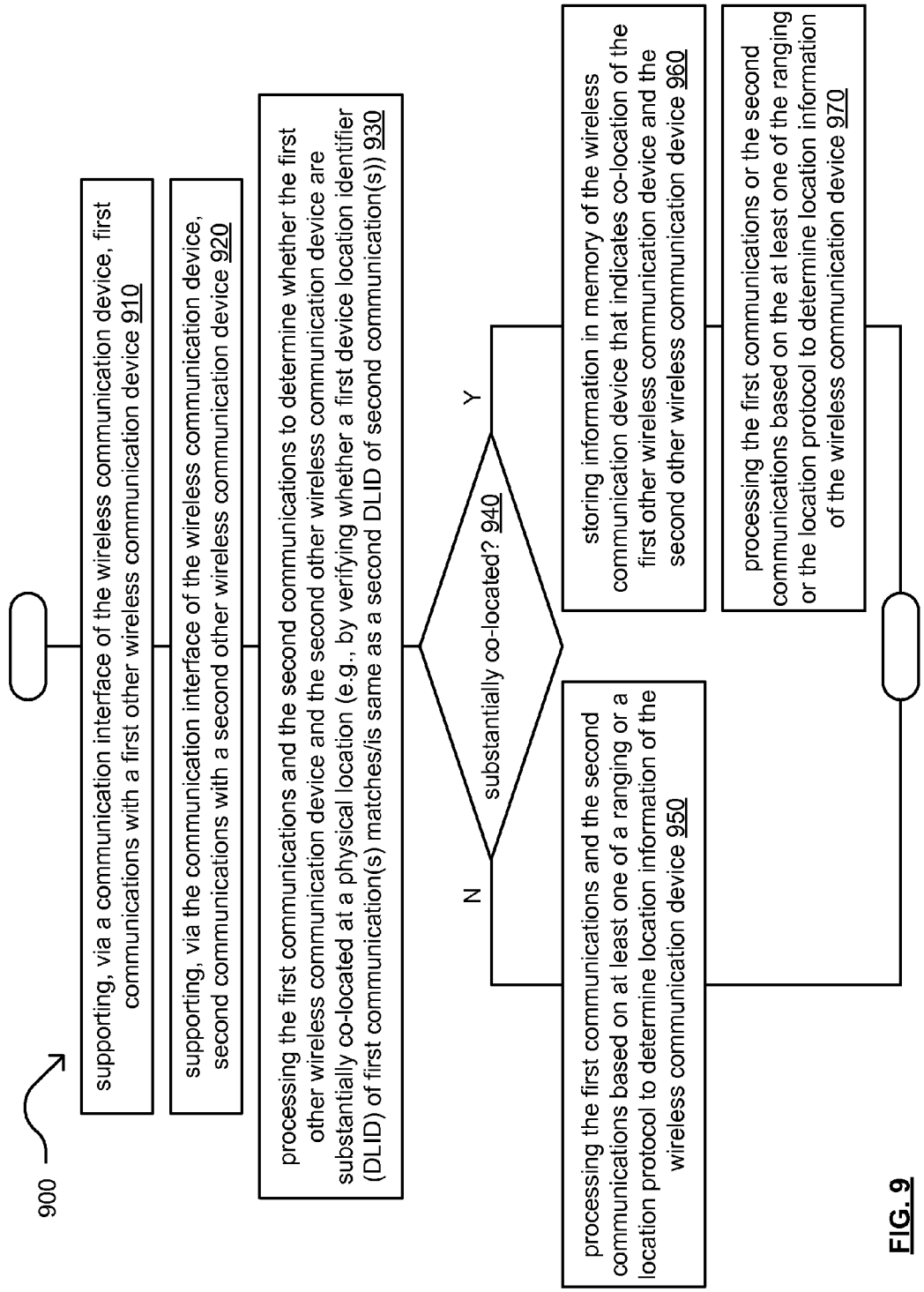
FIG. 9 is a diagram illustrating an embodiment of a method for execution by at least one wireless communication device.

FIG. 9 is a diagram illustrating an embodiment of a method 900 for execution by at least one wireless communication device. The method 900 operates by supporting, via a communication interface of the wireless communication device, first communications with a first other wireless communication device (block 910). The method 900 also operates by supporting, via the communication interface of the wireless communication device, second communications with a second other wireless communication device (block 920).

The method 900 continues by processing the first communications and the second communications to determine whether the first other wireless communication device and the second other wireless communication device are substantially co-located at a physical location (block 930). In some examples, this can be performed by verifying whether a first device location identifier (DLID) of first communication(s) matches, is same as, or identical to a second DLID of second communication(s). Such first communication(s) may be received from the first other wireless communication device, and second communication(s) may be received from the second other wireless communication device).

When the first other wireless communication device and the second other wireless communication device are determined not to be substantially co-located at the physical location (e.g., does not compare favorably as determined in the decision block 940), the method 900 continues by processing the first communications and the second communications based on at least one of a ranging or a location protocol to determine location information of the wireless communication device (block 950).

When the first other wireless communication device and the second other wireless communication device are determined to be substantially co-located at the physical location (e.g., compares favorably as determined in the decision block 940), the method 900 continues by storing information in memory of the wireless communication device that indicates co-location of the first other wireless communication device and the second other wireless communication device (block 960). The method 900 then continues by processing the first communications or the second communications based on the at least one of the ranging or the location protocol to determine location information of the wireless communication device (block 970).

It is noted that the various operations and functions described within various methods herein may be performed within a wireless communication device (e.g., such as by the processor 330, communication interface 320, and memory 340 as described with reference to FIG. 3A) and/or other components therein. Generally, a communication interface and processor in a wireless communication device can perform such operations.

Examples of some components may include one of more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
a processor, at least one of the processor or the communication interface configured to:
support first communications with a first other wireless communication device including a first advertisement that specifies therein a first fine timing measurement (FTM) protocol supported by the first other wireless communication device;
support second communications with a second other wireless communication device including a second advertisement that specifies therein a second FTM protocol supported by the second other wireless communication device;
process the first communications and the second communications to determine whether the first other wireless communication device and the second other wireless communication device are substantially co-located at a physical location;
process the first communications based on the first FTM protocol supported by the first other wireless communication device and the second communications based on the second FTM protocol supported by the second other wireless communication device to determine location information of the wireless communication device when the first other wireless communication device and the second other wireless communication device are determined not to be substantially co-located at the physical location; and
store information that indicates co-location of the first other wireless communication device and the second other wireless communication device and process only the first communications based on the first FTM protocol supported by the first other wireless communication device or only the second communications based on the second FTM protocol supported by the second other wireless communication device to determine location information of the wireless communication device when the first other wireless communication device and the second other wireless communication device are determined to be substantially co-located at the physical location, wherein the second communications are not processed based on the second FTM protocol when only the first communications are processed based on the first FTM protocol, and wherein the first communications are not processed based on the first FTM protocol when only the second communications are processed based on the second FTM protocol.

2. The wireless communication device of claim 1, wherein:
the first other wireless communication device is a first virtual or physical wireless communication device that is located at the physical location; and
the second other wireless communication device is a second virtual or physical wireless communication device that is located at the physical location.

3. The wireless communication device of claim 1, wherein:
the first other wireless communication device is a first radio of a multi-radio wireless communication device that is located at the physical location; and
the second other wireless communication device is a second radio of the multi-radio wireless communication device that is located at the physical location.

4. The wireless communication device of claim 1, wherein the at least one of the processor or the communication interface is further configured to:
process the first communications to identify a first device location identifier (DLID) associated with the first other wireless communication device;
process the second communications to identify a second DLID associated with the second other wireless communication device;
determine, when the first DLID is same as the second DLID, that the first other wireless communication device and the second other wireless communication device are substantially co-located at the physical location and store information that indicates the co-location of the first other wireless communication device and the second other wireless communication device; and
determine, when the first DLID is different than the second DLID, that the first other wireless communication device and the second other wireless communication device are not substantially co-located at the physical location.

5. The wireless communication device of claim 4, wherein:
the first DLID is included within a first DLID information element (IE) or a first sub-IE that is included within a first frame of the first communications transmitted from the wireless communication device; and the second DLID is included within a second DLID IE or a second sub-IE that is included within a second frame of the second communications transmitted from the wireless communication device.

6. The wireless communication device of claim 4, wherein:
the first DLID is included within a first DLID field that is included within a first frame of the first communications transmitted from the wireless communication device; and
the second DLID is included within a second DLID field that is included within a second frame of the second communications transmitted from the wireless communication device.

7. The wireless communication device of claim 1, wherein the at least one of the processor or the communication interface is further configured to:
support third communications with a third other wireless communication device;
process the third communications to determine whether the third other wireless communication device and at least one of the first other wireless communication device or the second other wireless communication device are substantially co-located at the physical location;
when the third other wireless communication device and the at least one of the first other wireless communication device or the second other wireless communication device are determined not to be substantially co-located at the physical location, process the third communications and at least one of the first communications or the second communications based on at least one of the first FTM protocol or the second FTM protocol to determine the location information of the wireless communication device; and
when the third other wireless communication device and the at least one of the first other wireless communication device or the second other wireless communication device are determined to be substantially co-located at the physical location, store information that indicates co-location of the third other wireless communication device and the at least one of the first other wireless communication device or the second other wireless communication device.

8. The wireless communication device of claim 1 further comprising:
a wireless station (STA), wherein at least one of the first other wireless communication device or the second other wireless communication device includes an access point (AP).

9. A wireless communication device comprising:
a communication interface that includes a first radio and a second radio; and
a processor, at least one of the processor or the communication interface configured to:
transmit a first communication to another wireless communication device using the first radio;
transmit a second communication to the another wireless communication device using the second radio, wherein:
a first frame of the first communication includes a first device location identifier (DLID) associated with the first radio and a first advertisement that specifies therein a first fine timing measurement (FTM) protocol supported by the first radio;

a second frame of the second communication includes a second DLID associated with the second radio and a second advertisement that specifies therein a second FTM protocol supported by the second radio; and
the first DLID and the second DLID indicate that the first radio and the second radio are substantially co-located at a physical location; and
support other communications with the another wireless communication device using only the first radio based on the first FTM protocol supported by the first radio or only the second radio based on the second FTM protocol supported by the second radio to determine location information of the another wireless communication device based on other location information of the wireless communication device, wherein the second radio is not used based on the second FTM protocol when only the first radio is used based on the first FTM protocol, and wherein the first radio is not used based on the first FTM protocol when only the second radio is used based on the second FTM protocol.

10. The wireless communication device of claim 9, wherein:
the first DLID is included within a first DLID information element (IE) or a first sub-IE that is included within the first frame of the first communication; and
the second DLID is included within a second DLID IE or a second sub-IE that is included within the second frame of the second communication.

11. The wireless communication device of claim 9, wherein:
the first DLID is included within a first DLID field that is included within the first frame of the first communication; and
the second DLID is included within a second DLID field that is included within the second frame of the second communication.

12. The wireless communication device of claim 9, wherein both the first DLID and the second DLID include a common plurality of bits.

13. The wireless communication device of claim 9 further comprising:
an access point (AP), wherein the another wireless communication device is a wireless station (STA).

14. A method for execution by a wireless communication device, the method comprising:
supporting, via a communication interface of the wireless communication device, first communications with a first other wireless communication device including a first advertisement that specifies therein a first fine timing measurement (FTM) protocol supported by the first other wireless communication device;
supporting, via the communication interface of the wireless communication device, second communications with a second other wireless communication device including a second advertisement that specifies therein a second FTM protocol supported by the second other wireless communication device;
processing the first communications and the second communications to determine whether the first other wireless communication device and the second other wireless communication device are substantially co-located at a physical location;
when the first other wireless communication device and the second other wireless communication device are determined not to be substantially co-located at the physical location, processing the first communications based on the first FTM protocol supported by the first other wireless communication device and the second communications based on the second FTM protocol supported by the second other wireless communication device to determine location information of the wireless communication device; and when the first other wireless communication device and the second other wireless communication device are determined to be substantially co-located at the physical location:
storing information in memory of the wireless communication device that indicates co-location of the first other wireless communication device and the second other wireless communication device; and
processing only the first communications based on the first FTM protocol supported by the first other wireless communication device or only the second communications based on the second FTM protocol supported by the second other wireless communication device to determine location information of the wireless communication location, wherein the second communications do not undergo processing based on the second FTM protocol when only the first communications are processed based on the first FTM protocol to determine location information of the wireless communication device, and wherein the first communications do not undergo processing based on the first FTM protocol when only the second communications are processed based on the second FTM protocol to determine location information of the wireless communication device.

15. The method of claim 14, wherein:
the first other wireless communication device is a first virtual or physical wireless communication device that is located at the physical location; and
the second other wireless communication device is a second or physical virtual wireless communication device that is located at the physical location.

16. The method of claim 14, wherein:
the first other wireless communication device is a first radio of a multi-radio wireless communication device that is located at the physical location; and
the second other wireless communication device is a second radio of the multi-radio wireless communication device that is located at the physical location.

17. The method of claim 14 further comprising:
processing the first communications to identify a first device location identifier (DLID) associated with the first other wireless communication device;
processing the second communications to identify a second DLID associated with the second other wireless communication device;
determining, when the first DLID is same as the second DLID, that the first other wireless communication device and the second other wireless communication device are substantially co-located at the physical location and storing the information that indicates the co-location of the first other wireless communication device and the second other wireless communication device; and
determining, when the first DLID is different than the second DLID, that the first other wireless communication device and the second other wireless communication device are not substantially co-located at the physical location.

18. The method of claim 17, wherein:
the first DLID is included within a first DLID information element (IE) or a first sub-IE that is included within a first frame of the first communications transmitted from the wireless communication device; and
the second DLID is included within a second DLID IE or a second sub-IE that is included within a second frame of the second communications transmitted from the wireless communication device.

19. The method of claim 14 further comprising:
supporting, via the communication interface of the wireless communication device, third communications with a third other wireless communication device;
processing the third communications to determine whether the third other wireless communication device and at least one of the first other wireless communication device or the second other wireless communication device are substantially co-located at the physical location;
when the third other wireless communication device and the at least one of the first other wireless communication device or the second other wireless communication device are determined not to be substantially co-located at the physical location, processing the third communications and at least one of the first communications or the second communications based on at least one of the first FTM protocol or the second FTM protocol to determine the location information of the wireless communication device; and
when the third other wireless communication device and the at least one of the first other wireless communication device or the second other wireless communication device are determined to be substantially co-located at the physical location, storing information that indicates co-location of the third other wireless communication device and the at least one of the first other wireless communication device or the second other wireless communication device.

20. The method of claim 14, wherein the wireless communication device is a wireless station (STA), wherein at least one of the first other wireless communication device or the second other wireless communication device includes an access point (AP).

* * * * *